Patented Oct. 4, 1932

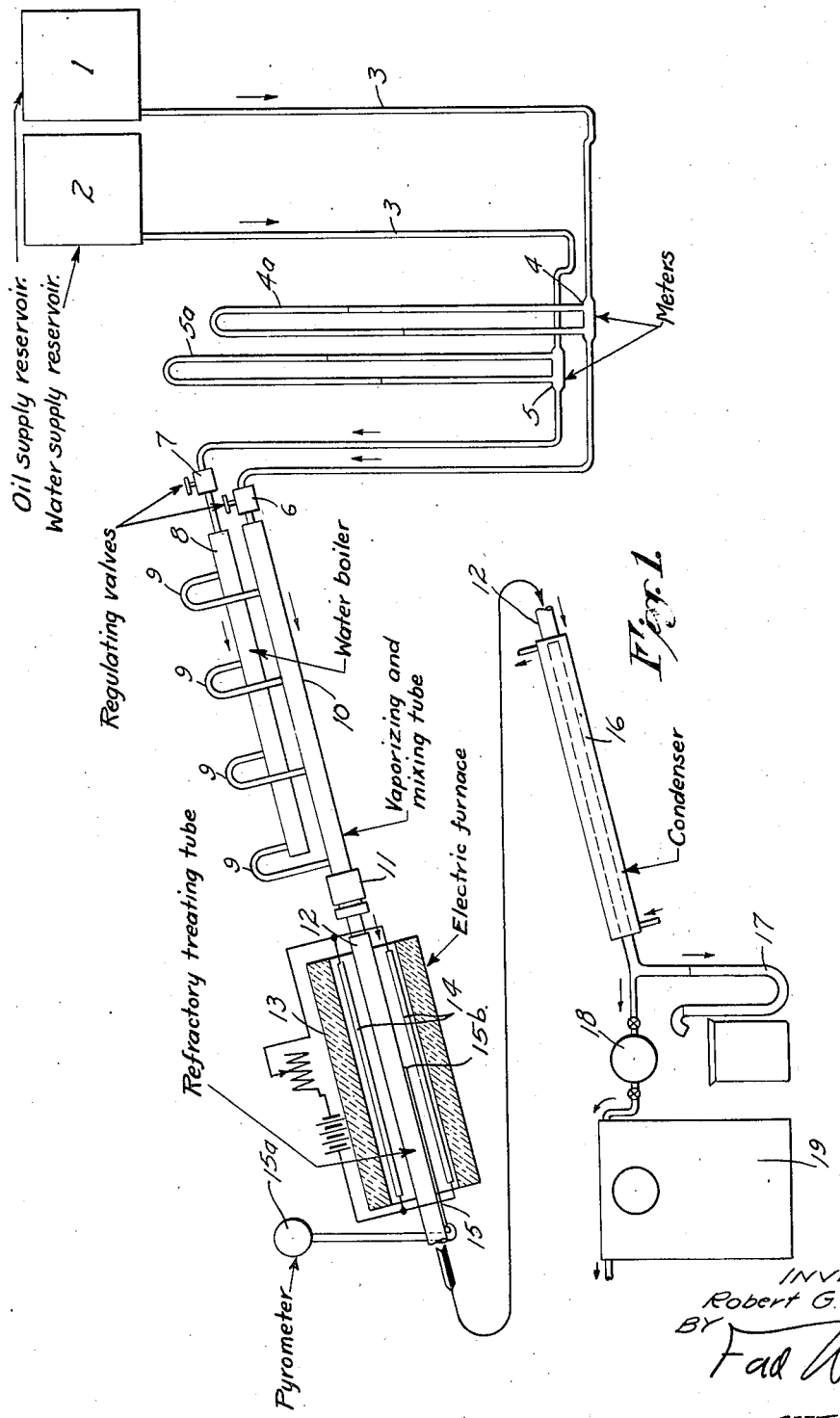

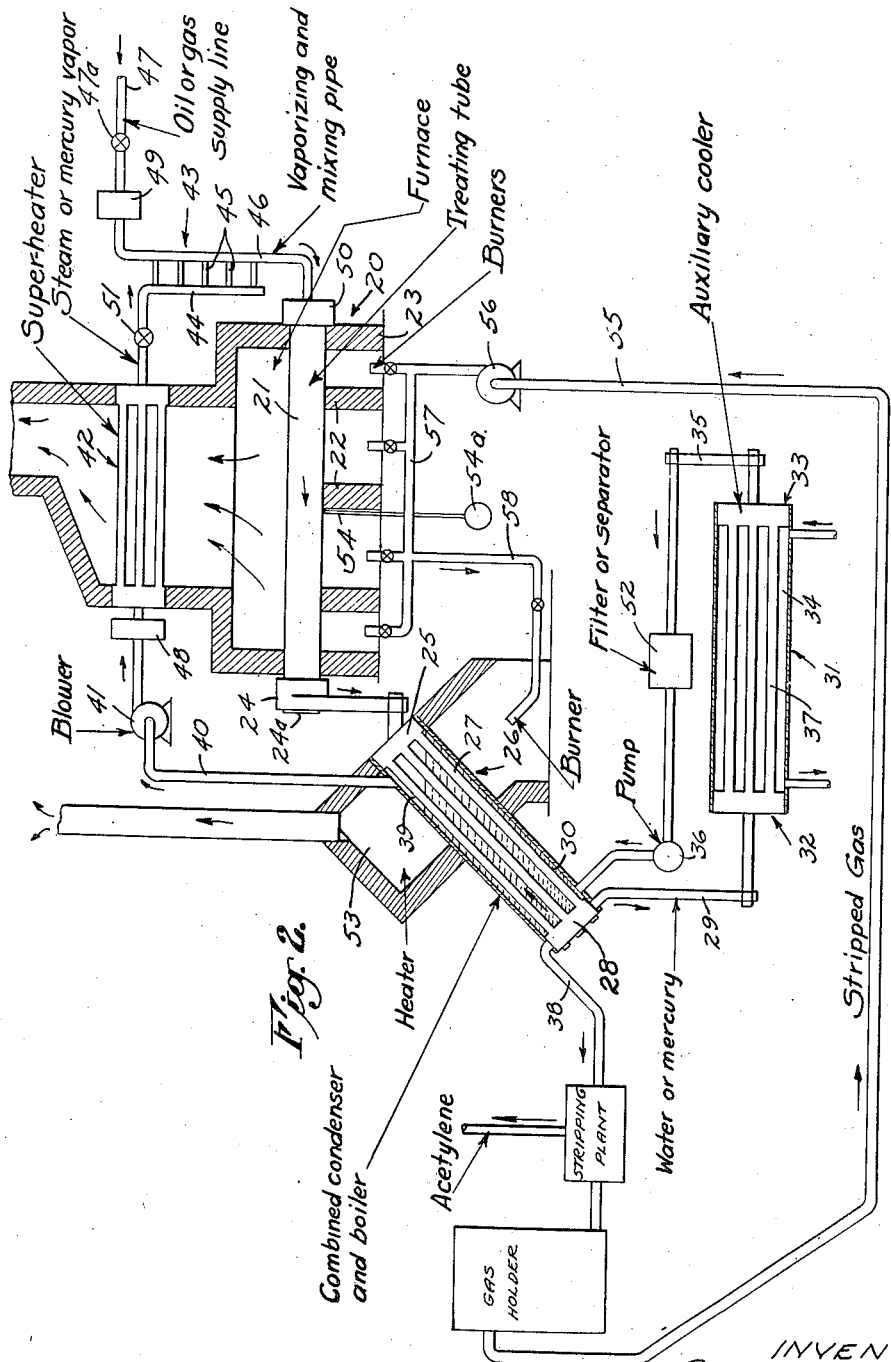

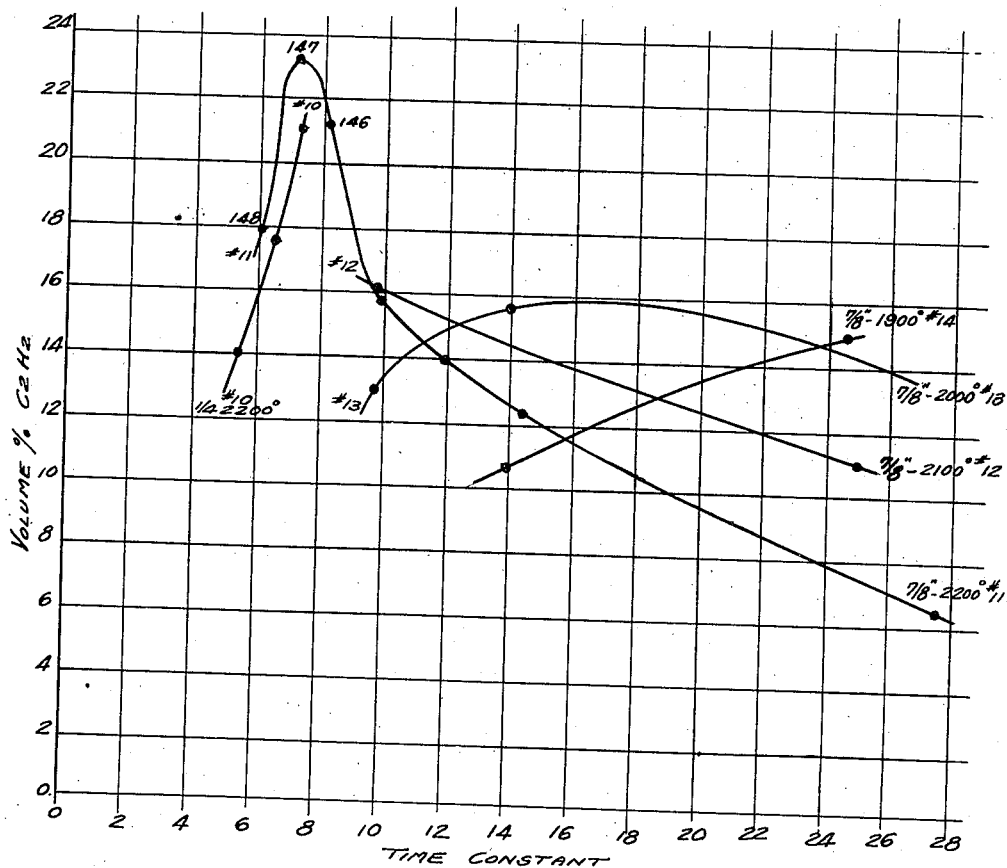

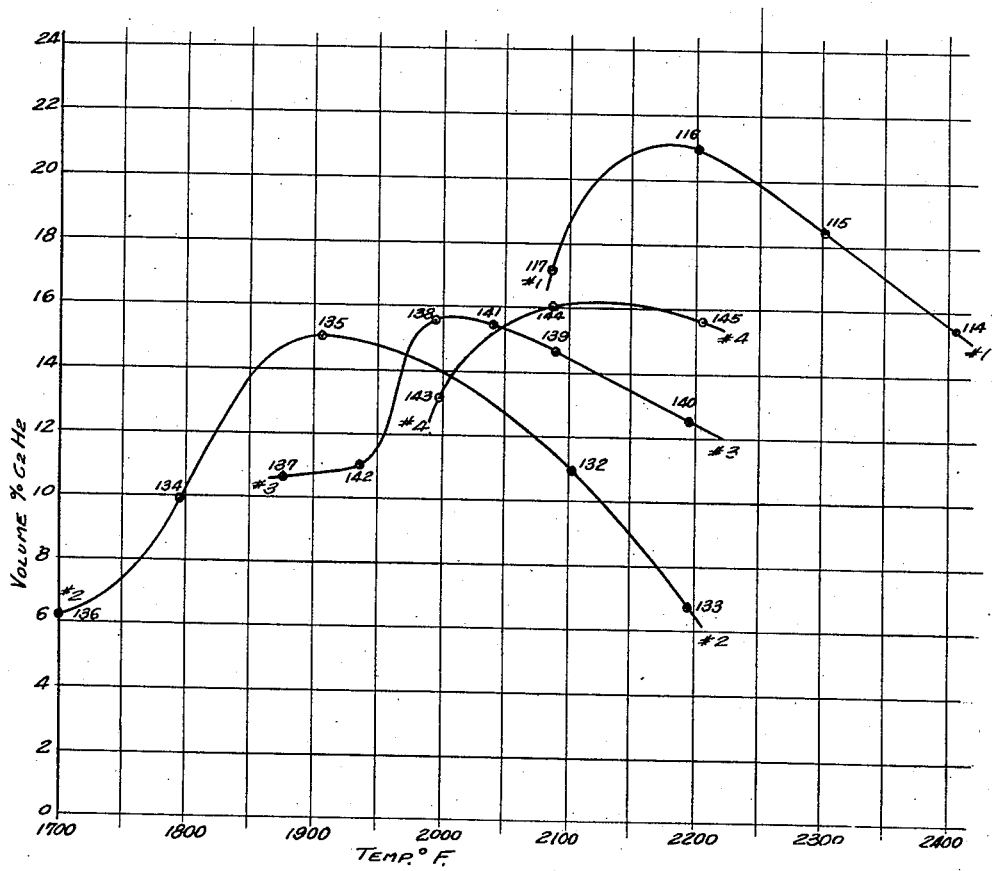

1,880,308

UNITED STATES PATENT OFFICE

ROBERT G. WULFF, OF LOS ANGELES, CALIFORNIA

PROCESS OF MAKING ACETYLENE AND OTHER PRODUCTS

Application filed May 29, 1928. Serial No. 281,406.

This invention relates to the production of acetylene, and a variety of gases, oils and tars from other hydrocarbons.

It has for its object the cheaper and more efficient production of acetylene, with it by-products of oils, tars, gases, and other substances, from a variety of raw materials among which are natural gas, artificial illuminating gas, gasoline vapor, oil vapor, gas oil vapor, paraffin series hydrocarbons, olefine series hydrocarbons and the cyclic hydrocarbons of the naphthene and benzene series.

The process by which such conversion is brought about is one of dehydrogenation or cracking or both, and the wide variety of materials to which it may be applied indicates that it is of quite general application. It may also be regarded as a "cracking" process, and is capable of making light oils from any of the raw materials mentioned in this specification.

The invention resides in the selection of raw materials, their treatment as to temperature, pressure, dilution, time of treatment, exposure to a contact mass, kinds of contact masses and apparatus employed, flow rates, and the treatment of the reaction products after they are generated, and other details as will hereinafter appear.

Fundamentally, my process is one of heat treating hydrocarbons or mixtures of hydrocarbons under reduced pressure for a certain period of time, and cooling rapidly thereafter. A pure vacuum or reduced pressure process would then in general make use of the usual low-pressure-producing equipment, which would be mechanical removal of vapors or steam ejection or a combination of them according to the greatest economy. There would be a furnace that preferably would be gas or oil-fired. This furnace would contain a tube of commercial dimensions, which would be heated to a practical temperature, in which the hydrocarbon or hydrocarbon mixture would be heated and the acetylene formed, together with the by-products. The rate at which the hydrocarbons are passed through a given tube depends very markedly on the temperature at which the tube is held, the diameter and length of the tube, its heat conductivity, the nature of the raw material being treated, and the value of the reduced pressure employed, otherwise termed and degree of vacuum.

While the present paragraphs very generally give the basis of my process, quantitative limits and a complete description will later be given for a preferred form of the process, which I have found to include the most favorable conditions of operation.

The aforedescribed process of straight vacuum treatment of the raw material then requires that the tube in which the treatment is being given does not leak materially. The same applies, of course, to the remainder of the equipment that might carry reduced pressure under operation. Absence of leakage is necessary to prevent dilution of the resulting gases previous to purification, as well as to prevent possible loss of the desired gases formed, by combustion with incoming leakage of air or flue gases.

I have found that there is material improvement in the formation of acetylene from a large variety of hydrocarbons due to the use of reduced pressure as disclosed above. Ethylene as a raw material, for instance, gives much more efficient formation of acetylene when treated under reduced pressure than when treated at atmospheric pressure.

I have found that in the formation of acetylene from hydrocarbons or mixtures of them by thermal treatment, whether at atmospheric pressure or at reduced pressure, it is generally preferable to treat at as high a temperature as practical.

Thus, as a rule there is formed permanent gas of larger acetylene content, and the efficiency with which the raw material forms acetylene is greater, that is, the greater the fraction of raw material converted to acetylene. I have also found out quite definitely that the higher the temperature of treatment the shorter must be the time of treatment, or the faster the raw material must be run through the treating tube. Data and curves to be given herein will show this clearly.

This treatment of hydrocarbons may be one of pure dehydrogenation as may be the case with the formation of acetylene from ethylene, or may be one of cracking or rupture of the hydrocarbon molecule, as is possible the action in forming acetylene from benzol or benzene. In the case of still other hydrocarbons it is a combination of both actions, as in the case of paraffine series hydrocarbons, naphthenes, and higher members of the olefine series.

The formation of acetylene is transient, and I have found empirically that the relative rates of change of hydrocarbons from one into another and their combination is such that if the length of time of treating is properly adjusted to the operating temperature and pressure with a given hydrocarbon or mixture of hydrocarbons, in a given tube, it is possible to form a gas of high content of acetylene. Most important, then, the rate of formation of acetylene under optimum conditions for formation of this gas of high acetylene content, is materially higher than the rate of its decomposition under those chosen conditions.

One reason for the better yield of acetylene under reduced pressure as compared with atmospheric pressure, is probably the following. It has been explained that the higher temperatures are preferred and that the time period of treatment is less for higher temperatures. In the cracking or thermal treatment of hydrocarbons to form acetylene there is required a large input of heat energy to accomplish the formation of acetylene together with the unavoidable auxiliary reactions. For a given period of treatment at a given temperature, treatment of a hydrocarbon at atmospheric pressure will require the transfer of a much larger quantity of heat per hour than if the same hydrocarbon were at a substantially reduced pressure. Thus there is a limitation in the treating tube which increases with the tube diameter, due to the smaller ratio of heat transfer area to cross-section in the larger tubes. Reduced pressure then can correct this difficulty. Also, it is advantageous to treat at reduced pressure, because the smaller temperature difference between outside and inside due to the aforementioned smaller rate of heat transfer, makes for temperature uniformity and makes possible operation at higher effective internal tube temperatures.

I have made many tests on forming acetylene at reduced pressures from just below atmospheric down to less than two millimeters of mercury absolute pressure. I have found that there is a difference in the effect of pressure of operation on different raw materials as to formation of acetylene. It seems, for instance, that the effect of pressure is not critical with the paraffine hydrocarbons and that a wide range may be employed. With benzol there seems to be a more decided decrease in the yield the higher the pressure employed.

Besides the usual or most obvious method of producing a reduced pressure on the raw material, as outlined above, I have found that it is also practical instead to dilute sufficiently the raw material to be treated, with indifferent or nearly indifferent vapor or gas chemically. I have found, for instance, that mercury vapor is totally indifferent to the formation of acetylene, and that taking tests made on a given hydrocarbon at a given pressure under the vacuum process, the substitution of mercury dilution for actual vacuum treatment, gives substantially the same results as long as the dilution is such as to produce the same weight of hydrocarbon per cubic foot as the compared straight vacuum test. In this way the density of hydrocarbon is held to the same value as in operation under pure reduced pressure, the time of treatment can therefore be held to the same value, and all other conditions can be the same.

The only difference then is that in the case of the dilution test the total pressure can be nearly atmospheric within the treating tube. This will probably mean better heat transfer from the inner walls of the tube to the raw material. At the same time, however, there is required a larger rate of heat transfer due to the heating of the diluent to the maximum temperature of operation or treatment for acetylene formation.

What the balance of these effects is, I do not know, but the explanation will serve to support the statement that the conditions of time, temperature, pressure and tube dimensions, will not necessarily be the same in going from the straight reduced pressure operation to the method of dilution. Results are however reasonably the same under the same conditions of operation by the two methods.

I have also found that there are certain conditions in the thermal treatment of hydrocarbons to produce acetylene under pure reduced pressure where a small change in one of the variables will have suddenly a large effect on the acetylene, what would be an extreme break in the curve showing the relation between the two. I have in no case observed as sudden a break where the tests were conducted with the method of dilution for pressure reduction. It is my opinion therefore that there are problems of heat transfer in the case of operation with pure reduced pressure, which can critically affect the acetylene yield, and that there is an advantage in the use of dilution as a substitute for pure reduced pressure, which balances the rate of heat transfer to the raw material being converted into acetylene, or steadies it so that the breaks are not as sudden.

For instance, in a certain case with constant given conditions in making acetylene from oil under pure vacuum at an absolute pressure of 6.4 millimeters mercury, the resulting gas had 17.5% by volume of acetylene. The mere change in these conditions, of operating at 11.3 millimeters instead of 6.4 reduced the acetylene percentage to 0.47. I have not found such decided breaks where the method of pressure reduction was dilution It is then of course an advantage not to have such critical effects because conditions of operation will have to be held too close.

I have even found that the use of steam as a diluent is entirely practical, and that the use of steam is accompanied with the formation of substantial quantities of carbon monoxide. This shows therefore that it is not necessary that the diluent be entirely indifferent to the operation, or the reactions which form acetylene.

It is important to point out that there is an additional advantage in having the total internal pressure near atmospheric, because one thereby minimizes very materially the problem of leakage through the walls of the treating tube and through the joints. It is difficult to secure refractory treating tubes that will withstand the temperatures employed and at the same time be gas-tight for high vacuum use.

Besides this, it cuts down the high cost of vacuum-producing equipment when dilution is employed as an alternative for the treating of a raw material at a low absolute pressure. Inward leakage when operating under reduced total pressure within the treating tube, will introduce carbon dioxide from the furnace, an inert gas which would render the resulting mixture poorer in content of acetylene and other products. Not only that, but carbon dioxide, and air which might also enter through the joints, are destructive of acetylene and probably of other of the desirable products of the process.

Dilution with any suitable material also has the advantage of producing a scrubbing action within the treating tube so as to lessen the accumulation of carbon therein, much greater than that performed by the raw material alone when the same is treated under straight reduced pressure. Water has the additional advantage over mercury in that it is capable of reacting with the carbon accumulating in the treating tube and removing it in the form of a gas.

Despite the fact that the steam of the dilution is not totally indifferent chemically, results as to acetylene formation from a given hydrocarbon are similar again to those found in straight reduced pressure treatment under the same conditions. In other words, whether the raw material is treated alone at a given absolute pressure under a given set of conditions, or whether it is brought to the same absolute partial pressure by sufficient dilution with mercury or steam or presumably other diluents, and treated under the same conditions, results as to acetylene formation are not very different.

Whatever the diluent used, it is of advantage as to concentrating the gas mixture formed from the raw material, that said diluent be easily condensible with respect to the said gas mixture. The lower the absolute partial pressure of raw material being treated, the more important the advantage of easy condensibility of the diluent. By easy condensibility is meant condensibility at relatively higher temperature.

I have found that under favorable conditions for formation of acetylene by any reduced pressure scheme disclosed above, the resulting gas mixture after condensation of any diluent, contains usually over fifty percent of hydrogen, from ten to forty percent of acetylene, several percent of ethylene, and a little methane. With a gas of this composition, of course mercury and water are to be classed as easily condensible. As to the efficiency, however, with which acetylene is formed from a hydrocarbon, it is obviously not necessary that the diluent be easily condensible. Therefore, nitrogen and many other gases could be used as diluents, and suited schemes of separation of the constituents desired employed.

I have even found, for instance, that a natural gas containing 85% of methane and fifteen percent of higher members of the paraffine series, forms acetylene efficiently in reference to the higher hydrocarbon content. In connection with this I have found that pure methane will form acetylene itself, but not in as high a percentage as will natural gas under the same conditions, of the above composition; and also not in as high a percentage as pure methane to which has been added casing-head gasoline vapor. All the substance of this paragraph refers to the treatment of the gas mixture mentioned or the pure gas at a total pressure of approximately one atmosphere absolute. Thus, the higher hydrocarbon content may here be regarded as diluted with methane which though not under all conditions inert, is nevertheless relatively so. In one case where I had cracked natural gas at atmospheric pressure, I found that the quantity of methane after treatment was substantially the same as before, and that the higher hydrocarbons had virtually disappeared. There was a resulting acetylene content which represented efficient conversion of these higher hydrocarbons to actylene. This fact is regarded as important since natural gas of substantial higher hydrocarbon content and of large methane content, is available in many places and is already in a condition of dilution suitable to formation of acetylene by treatment at a total pressure of approximately one atmosphere.

Hydrogen can also unquestionably be used as a diluent, since it appears in large proportion as disclosed above, under conditions which form acetylene efficiently.

I have also carried out tests on the formation of ethylene from gas oil, which latter had about 30% of naphthenes, 10% aromatics, and the remainder paraffins. These tests were carried out under dilution with mercury vapor. Under favorable conditions a gas mixture was formed after condensation of the mercury, which showed over 30% ethylene. I have also carried out many tests on this same gas oil under straight reduced pressure and under dilution with mercury and also under dilution with steam, all separately. There was a substantial content of ethylene under conditions suitable to the efficient formation of acetylene by these different methods. For this reason I believe that the main action in the formation of acetylene from hydrocarbons of the paraffine series higher than methane, is one of primary formation of ethylene which in turn forms acetylene efficiently, all in one heat treatment. I have also found out that pure ethylene under thermal treatment when diluted with mercury vapor, forms acetylene very efficiently. In this manner I actually formed a gas mixture containing over 40% acetylene, and at the same time converted the ethylene within 65% of perfect, or theoretical maximum, into acetylene.

Whatever the hydrocarbonaceous raw material and whatever the means of pressure reduction employed, the gas mixture resulting from treatment of the raw material under conditions suitable to efficient formation of acetylene showed almost without exception, about 1.0% allylene $CH_3C$ $CH$, 0.5 to 15.0% ethylene, 1.0 to 3.0% olefines higher than ethylene in the series, and from 10.0 to 40.0% acetylene and more. It was found also that whenever suitable conditions were set up for formation of acetylene from a given hydrocarbon, there was usually formed some heavy brown oil and some light oil sometimes very pale yellow in color. The temperatures at which these results were obtained range from 2000° F. to 2500° F.

Decreasing the temperature from 2000° F. sharply decreases the acetylene content, but increases rapidly the available content of ethylene and higher olefines in the resulting formed gas. Thus, when using oil as raw material and diluting with mercury, it is possible to secure a gas containing as much as 34.0% ethylene, 21.0% higher olefines, 35.0% methane, and 18.0% higher saturated hydrocarbons. Temperatures of operation for these results range from 1400° to 1850° F., although lower temperatures can also be used by giving more time to the treating action.

Referring to the accompanying drawings:

Fig. 1 is a more or less diagrammatic representation of the apparatus by which the process may be carried out on a laboratory scale.

Fig. 2 is a diagrammatic representation of a large commercial apparatus for performing the process.

Fig. 3 is a collection of curves showing the effect of time of treatment or rate of oil and steam flow on the acetylene yield at different constant temperatures and with different treating tubes.

Fig. 4 is a collection of curves showing the effect of temperature on the acetylene yield in different treating tubes and at different constant rates of oil and steam flow.

In Fig. 1, numeral 1 indicates an oil supply reservoir, 2, a water supply, and 3—3, delivery pipes for each, these supplying about a ten foot head. 4 and 5 represent oil and water meters, respectively, of the orifice type, $4^a$ and $5^a$ being manometers for gauging the flow. 6 and 7 are needle valves for regulating the flow of oil and water, respectively. 8 is a water boiling tube, this being merely a brass or steel tube wound externally with "nichrome" resistance wire. It may be adapted for generating mercury vapor in place of steam. Ducts leading steam from the tube 8 to the vaporizing and mixing tube 10 are shown at 9—9—9—9. The superheated steam generated in the tube 8 meets the stream of metered oil in the steel tube 10 and vaporizes it. If necessary, the tube 10 may also be externally heated to insure total vaporization of the oil and its efficient admixture to the entering steam. 11 is a packing gland at the far end of the tube 10, joining the tube 10 with the tube 12 in gas-tight manner, while 12 is the treating tube itself, which may be porcelain or sillimanite, but is made preferably of fused silica, of wall thickness depending upon the tube size. It may be filled with carborundum or other refractory "grain" or crystals (not shown). Copper and iron must be absent from the hot zone of the tube, since they decompose acetylene at high temperatures. 13 is a furnace surrounding the tube 12, containing carborundum rods 14, these constituting the heating element.

A thermo-couple is placed next the treating tube 12 at 15, the sensitive junction of which is shown at $15^b$. It is connected to an indicating pyrometer $15^a$. The temperatures given herein, are therefore those of the outside of the tube 12, as measured at $15^b$, which is near the hottest portion of said tube. 16 is a condenser of the Liebig type, through the jacket of which cooling water is circulated. Condensed steam from the tube 12 finds an outlet through a U-tube 17. A gas sampling bulb 18 is placed in the line and it is from the point shown that samples were taken as a basis for the data to be given later. 19 is a gas meter adapted to measure the output of the installation.

The large scale apparatus represented in Fig. 2, comprises an oil or gas supplying line 47 in which there is a valve 47ª and a meter 49. The line is joined with a vaporizing and mixing pipe 43, into which several cross pipes 45 deliver steam from the header 44. The lower part 46 of the vaporizing pipe 43 leads to an oil or gas-fired furnace 20, housing a carborundum (or equivalent) treating tube 21, about 12 feet long and about 8 inches inside diameter, which is filled with broken or crystalline carborundum, quartz or sillimanite or other suitable refractory, (not shown) and touching which is a thermocouple 54, which is connected to an indicating pyrometer 54ª. The arrangement in the furnace may be of about six treating tubes of about 8 inches inside diameter, these being filled with loose refractory crystals or broken pieces, or any of the conventional forms of tower packing.

These treating tubes may be joined in parallel or in series, or in any desired series-parallel arrangement. The filler serves the purpose of stirring the gas or vapor mixture and is desirable in accomplishing quick heating in large tubes. The tube is supported by piers 22 at various points. A gland or stuffing box 50 connects the tube 46 and 21 in a gas-tight manner.

Any kind of refractory tube material or filling material may be used. A carborundum tube with a sillimanite filling can be used, or vice versa. The only conditions to be met are that the materials be sufficiently refractory and that they will not fuse with each other, or be detrimental to the formation of acetylene or other products desired.

On the far end of the refractory tube 21, there is an exit head 24, bearing a removable cap 24ª, through which the head and tube may be cleaned of carbon and tar when necessary. The exit head 24 connects, as to its other end, with a combined condenser and boiler 26 adapted for vaporizing and condensing either water or mercury. The latter consists of a shell and two headers 25 and 28, connected by a large number of tubes as at 39, which in this case should not be made of copper. In fact, no portion of the equipment coming in contact with acetylene should be of copper. Thin steel tubes are preferred, and these may be of "stainless" alloy or otherwise rust-proof.

The headers and tubes are so arranged that gases coming to the condenser are handled within the headers and tubes, heat transfer occurring through the walls of the tubes. The condenser is in a canted position so that a space about the place of entry of the pipe 40 is clear of water when the water level in the condenser is near the top. A downcoming pipe 29 serves to drain water from the condenser to an auxiliary cooler 31, of similar construction, but in horizontal position.

Warm water is furnished the auxiliary cooler by gravity and it is returned to the condenser after being cooled, by means of a pipe 35 and pump 36. A filter 52 is connected into the pipe line 35 to remove any solid impurities which may have been introduced into the water. A device for separating emulsified oil or otherwise conditioning or purifying the water may also be introduced into the line at this point.

Encircling the upper part of the condenser and boiler 26 is a heater, preferably gas-fired. Its function is to generate steam or mercury vapor in the upper part of the boiler and condenser. The pipe 40 and blower 41 are provided to transfer the steam formed in the boiler 26 to a superheater 42, before which is a steam meter 48. After the superheater, in the steam delivery line, is a valve 51, serving to control the steam flow. A number of cross pipes 45, already mentioned, connect the header 44 with the vaporizing pipe 43.

A stripping plant (diagrammatically shown) is provided to separate the acetylene and other valuable products from the gas mixture generated. The stripped gas is stored in the gas holder until needed, when it is burned under the cracking tube 21, being transferred there through the pipe 55 by a blower 56 through a manifold 57. A pipe 58 also carries gas to the steam generator 26.

The method of operation of the apparatus of Fig. 1 is as follows:

The valves 6 and 7 are opened until the meters 4 and 5 give proper readings of the respective rates of flow. Oil and water then flow from their respective receptacles 1 and 2. The current for heating the furnace 13 has meanwhile been switched on. The tube 8 is likewise meanwhile heated. Metered water entering the tube 8 is therefore immediately converted into steam which enters the cross tubes 9, meeting the oil stream in the tube 10, where said oil is vaporized. The tube 10 may be heated externally in any conventional manner if necessary to accomplish full vaporization of the oil and its efficient mixing with the steam.

The mixture of oil vapor and steam then passes into the cracking tube 12, which may be made of kieselguhr and clay composition, carborundum, fused silica, sillimanite, porcelain or other ceramic and refractory materials. Its temperature is not less than 1500° F. and may be as high as 3500° F. The higher temperatures are preferred.

The tube is of such a length and the flow of vapor so regulated that the time of exposure of the mixed vapors to the heat of the furnace ranges from $\frac{1}{1000}$ second to 5 seconds, depending upon the temperature of operation, and the amount of cracking surface exposed to the vapors. The amount of dilution of the oil vapor by steam or other diluent is such that the partial vapor pressure of the oil vapor ranges from just below atmospheric to approximately $\frac{1}{20}$ inch of mercury, absolute pressure. The lower pressures are preferred, since it is known that reactions of this type which involve increases in gas volume are assisted by low pressures.

The cracking tube 12 is preferably filled throughout its length, which approximates 18 inches, with carborundum grain, the size of which is about ¼ the inside diameter of the tube. The tube itself has an internal diameter of about one inch.

The following data is a report of the results obtained in putting through the above apparatus a gas oil purchased from the General Petroleum Corporation of California. It is known as their gas oil No. 1, and contains from 30% to 35% of naphthenes, 10-12% aromatics and the remainder paraffin series hydrocarbons. In some of the tests, as will be noted on the tables below, the tube diameter was changed for examination of the effect of tube size on formation of acetylene. In the case of all data given herein, however, the several cracking tubes were heated in the same furnace, and therefore were heated for the same length, so that a comparison between tubes was possible based on internal cross-section which governed the time of cracking at any one rate of oil and steam flow.

Explanation of captions.
 a. Test number.
 b. Lb. per hour of steam.
 c. Lb. per hour of oil.
 d. Millimeters of mercury pressure (partial) of oil before cracking.
 e. Millimeters mercury partial pressure of the fixed gas before condensation of the steam, but after completion of cracking.
 f. Cu. ft. per hour of fixed gas formed, room temperature and one atmosphere absolute pressure.
 g. Temperature Fahrenheit (approximately the maximum temperature on the outside wall of the tube at its hottest point).
 h. Time constant, derived by dividing the square of the internal tube diameter by the cu. ft. per hour of steam. Here the diameter is expressed in inches and the steam volume as reduced to one atmosphere absolute pressure and room temperature. For example, thus one pound of steam would represent 21.3 cu. ft. assuming that the steam would remain in the vapor phase at room temperature and one atmosphere absolute. This term is used merely because of the facility of computation and for all purposes here is proportional to the actual volume occupied at any one temperature. It must be realized that as the oil and steam mixture starts through the tube it is increasing steadily in temperature and therefore expanding partly from this cause alone before any cracking takes place. The steam and oil volume is therefore constant at no time and the time of heating therefore very difficult to arrive at.
 i. Percent by volume of acetylene in the fixed gas.
 j. Efficiency of conversion of oil into acetylene. Expressed in percent by weight.

TABLE No. 1.—¼" inside diameter sillimanite cracking tube, 0.08" tube wall. Not filled with refractory

| a | b | c | d | e | f | g | h | i | j |
|---|---|---|---|---|---|---|---|---|---|
| 114 | .403 | .0141 | 3.36 | 38.6 | .459 | 2403 | 7.26 | 15.50 | 34.1 |
| 115 | .399 | .0133 | 3.19 | 31.3 | .367 | 2301 | 7.34 | 18.52 | 34.5 |
| 116 | .401 | .0133 | 3.17 | 21.4 | .248 | 2201 | 7.30 | 21.0 | 26.5 |
| 117 | .407 | .0133 | 3.14 | 16.8 | .1970 | 2088 | 7.18 | 17.20 | 17.2 |
| 118 | .450 | .0163 | 3.48 | 22.4 | .292 | 2200 | 6.50 | 17.55 | 21.2 |
| 119 | .538 | .0190 | 3.39 | 19.01 | .294 | 2218 | 5.46 | 15.90 | 16.7 |
| 120 | .523 | .0179 | 3.29 | 23.2 | .351 | 2301 | 5.60 | 17.85 | 23.7 |
| 121 | .539 | .0179 | 3.19 | 28.3 | .446 | 2401 | 5.43 | 17.30 | 29.2 |
| 122 | .531 | .0191 | 3.45 | 27.1 | .420 | 2354 | 5.52 | 17.55 | 26.1 |

In the first four tests there was varied nothing but the temperature so as to see the effect on the acetylene percentage and the efficiency of formation.

The fifth test shows a little higher oil and steam rates of flow over the first four. It should be stated that throughout this description, in all tests mentioned and for which data are given herein, the proportion of oil to water flow was held constant. The constancy of the proportion of oil to water may be seen from the listed partial pressure of the oil vapor in the mixture, item $d$ of the tables.

Tests 119–122 inclusive show a still larger flow of oil and steam over the previous ones. Thus, in these three groups of tests indicated there is a change in the time of heating due to the hourly passage of different amounts of steam and oil through the same tube.

The study of the foregoing table as well as that of others to follow will be easier from curves to be given herein. In this manner it will be much easier to see the different effects and to appreciate the reason for the different experiments.

Full discussion of the tests will be given mainly with reference to the curves of Figs. 3 and 4 after all the data has been given. Test numbers will be found to identify the points so plotted so as to facilitate reference to the curves and tables.

TABLE No. 2.—0.4" inside diameter fused silica tube. Not filled with refractory. ⅛" tube wall

| a | b | c | d | e | f | g | h | i | j |
|---|---|---|---|---|---|---|---|---|---|
| 123 | .492 | .0181 | 3.53 | 18.25 | .258 | 2003 | 15.25 | 11.88 | 11.5 |
| 124 | .547 | .0184 | 3.23 | 17.67 | .278 | 2100 | 13.72 | 13.06 | 13.9 |
| 125 | .507 | .0182 | 3.45 | 24.4 | .359 | 2198 | 14.77 | 14.80 | 19.8 |
| 126 | .520 | .0180 | 3.32 | 28.4 | .435 | 2300 | 14.38 | 13.30 | 21.7 |
| 127 | .829 | .0230 | 2.67 | 13.63 | .323 | 2100 | 9.04 | 12.50 | 11.9 |
| 128 | .644 | .0230 | 3.43 | 16.07 | .297 | 2100 | 11.62 | 11.78 | 10.3 |
| 129 | .630 | .0235 | 3.58 | 21.9 | .400 | 2204 | 11.90 | 13.98 | 16.1 |
| 130 | .607 | .0231 | 3.64 | 25.8 | .455 | 2300 | 12.34 | 13.87 | 18.5 |

Tests 123 to 126 inclusive were intended to show the variations of acetylene percentage with temperature as well as the variation in the efficiency of conversion with temperature, everything else held constant. Test 127 was intended to be a larger flow of oil and steam in proportion to those preceding. Actually the water flow was higher than wanted and this was corrected in the tests 128-130 following. These last three tests are intended to have constant conditions except for temperature, again to see the variation in acetylene percent and efficiency of formation.

The above results show that it is possible to obtain, by the use of a small bore, unfilled refractory tube, percentages of acetylene that are nearly as high as those obtained in filled tubes of larger bore. This is probably because intimate contact is obtained between the gas and the tube wall on account of the small bore.

TABLE No. 3.—$7/8''$ inside diameter fused silica tube filled with 3 mesh carborundum grain (crystals) $1/8''$ tube wall

| a | b | c | d | e | f | g | h | i | j |
|---|---|---|---|---|---|---|---|---|---|
| 131 | .690 | .0222 | 3.08 | 25.6 | .513 | 1998 | 25.9 | 14.02 | 22.0 |
| 132 | .704 | .0228 | 3.11 | 31.1 | .641 | 2104 | 25.4 | 10.96 | 20.8 |
| 133 | .652 | .0213 | 3.13 | 41.9 | .813 | 2196 | 27.5 | 6.76 | 17.5 |
| 134 | .726 | .0238 | 3.18 | 15.08 | .309 | 1796 | 24.6 | 9.90 | 8.70 |
| 135 | .726 | .0227 | 3.04 | 18.27 | .376 | 1907 | 24.6 | 15.02 | 16.8 |
| 136 | .679 | .0220 | 3.11 | 12.52 | .243 | 1701 | 26.4 | 6.26 | 4.68 |
| 137 | 1.286 | .0466 | 3.46 | 17.6 | .651 | 1877 | 13.9 | 10.64 | 10.1 |
| 138 | " | .0466 | 3.46 | 20.9 | .780 | 1996 | 13.9 | 15.60 | 17.7 |
| 139 | 1.154 | .0461 | 3.83 | 32.4 | 1.095 | 2090 | 15.5 | 14.60 | 23.5 |
| 140 | 1.246 | .0467 | 3.61 | 34.3 | 1.250 | 2197 | 14.4 | 12.52 | 22.6 |
| 141 | 1.255 | .0464 | 3.56 | 21.4 | .776 | 2041 | 14.2 | 15.42 | 17.4 |
| 142 | 1.263 | .0470 | 3.57 | 18.3 | .667 | 1937 | 14.1 | 11.00 | 10.5 |
| 143 | 1.848 | .0713 | 3.69 | 19.3 | 1.028 | 2001 | 9.70 | 13.14 | 12.8 |
| 144 | " | .0714 | 3.69 | 26.2 | 1.410 | 2089 | 9.70 | 16.06 | 21.4 |
| 145 | 1.817 | .0587 | 3.62 | 30.4 | 1.620 | 2207 | 9.85 | 15.68 | 25.0 |
| 146 | 2.19 | .0844 | 3.68 | 31.6 | 2.035 | 2206 | 8.15 | 21.1 | 34.3 |
| 147 | 2.51 | .0970 | 3.71 | 29.3 | 2.15 | 2193 | 7.15 | 23.2 | 34.6 |
| 148 | 2.95 | .1164 | 3.79 | 26.4 | 2.26 | 2193 | 6.07 | 17.92 | 23.6 |

Tests 131–136 have constant conditions except for the temperature which was varied to see the effect on the acetylene percentage and conversion efficiency. Tests 137–142 are the same at a higher oil and steam flow than the preceding, meaning a shorter time of heating. Tests 143–145 are the same thing again at a still higher oil and steam rate of flow. Tests 146–148 were carried out at a constant temperature but varying the rate of oil and steam flow, the reason for which will be apparent from the discussion below.

An example is here given of the method of arriving at the figure called the time constant, item $h$ of the tables.

Lb./hr. of steam × 21.35 gives cu. ft./hr. of steam, this being the volume of the steam if it were cooled to room temperature and still held at one atmosphere without condensation. Actually this is impossible but it is still a valid constant for the time of cracking comparison. Thus as in test No. 114, we have
.403 × 21.35 = 8.58 cu. ft./hr. of steam.
tube diameter $1/4''$
$(1/4)^2 = .0625$. then $(.0625/8.58) \times 1000 = 7.26$.

In the case of the $7/8''$ tube which was filled with carborundum crystals, it was assumed that the actual free volume of the tube was half of what it would be empty. This is pretty closely true, for instance when such crystals are used to fill a glass of about a half pint capacity.

So far it is apparent that the best found conditions for production of acetylene at a given temperature show that the higher the temperature the greater the percentage of acetylene in the permanently formed gas and also the higher the temperature the greater the efficiency of acetylene production or conversion of the oil.

Referring now to curves 2, 3, and 4, Fig. 4, which represent the tests on the $7/8''$ tube, it is clear that the acetylene percentage passes through a maximum as the temperature is increased. This maximum occurs at a higher temperature the shorter the time of heating or the smaller the time constant. This can mean partly that it takes a higher temperature difference between the outside wall of the tube and the inside to pass the heat required on account of the higher rate of gas treatment, and also that the higher temperature thus will be necessary to increase the rate of cracking and acetylene formation.

It is also obvious from curves 11, 12 and 13 of Fig. 3 that after the maximum of acetylene at any one temperature has been formed, any continued heating is very detrimental to the percentage of acetylene.

Another fact is that the higher the temperature, the higher the maximum percentage of acetylene, as is seen from the curves.

Curves 10–14 of Fig. 3 were derived from the curves 1, 2, 3 and 4 of Fig. 4, together with other data in the tables. It is obvious that the higher the temperature the more positive the increase in acetylene percentage with the decrease in time of heating between the time limits 10 to 26. It must also be true that the higher the temperature the smaller the time at which the maximum percent of acetylene appears. It is proved on these curves definitely that at 2200° F. there is a fairly sharp peak at a time of 7, and that at 2000° F. there is a maximum, somewhere on the time scale at a value much larger than 7. It is also seen that the higher the temperature of operation the more narrow is the practical range of time of heating. Compare curves 11 and 13. Therefore the higher the temperature of operation the more accurately the time of heating has to be controlled and the more accurately the temperature as well must be controlled.

For operation of the apparatus of Fig. 1, according to the conditions of test 147, the time of treating is approximately $\frac{1}{16}$ of a second. For operation of the same equipment according to test 135 the time of treating is about 0.21 second. This shows that there is a wide variation in the most suitable length of time of treatment for each of two temperatures not very different from each other, namely 1900° and 2200° F. So, for temperatures above 3400° F. the time of heating or treating may be shortened to as little as 0.002 second, and for lower temperatures around 1400° F. may be increased to as much as five seconds.

The tables of data show that the efficiency with which oil is converted to acetylene increases with the acetylene percentage, but that there is a tendency for the maximum efficiency to occur at a temperature higher than that at which the maximum acetylene percentage occurs, given any one time of heating. However, test 147 at once shows the highest acetylene percentage obtained by this process, and also the highest efficiency of acetylene formation from oil Another advantage of this process is that the carbon that is always formed from cracking oil, usually in the hottest part of the tube, will in this process not accumulate, or can be removed. Water vapor will certainly be removing carbon at an appreciable rate as it forms. If it forms in a commercial furnace more rapidly than the water vapor removes it, it will only be necessary in practice to turn the oil off for a while, suspending acetylene formation to clean the tube out.

The heat balance will not be very seriously interfered with due to the fact that there is so much steam going through in operation compared to the amount of oil. Certainly, after such a cleaning there would be much less time lost than if it were necessary to cool down and probably less time lost even than if instead of cooling down, production was shut off and air run through. This latter would probably be the easiest means of removing accumulated carbon in the case of the mercury process.

The carbon removing action in the case of water is of course that of the water gas reaction in which the carbon by reacting with the steam is converted to carbon monoxide and removed as a gas. In the case of using air, it would be one of carbon monoxide and carbon dioxide formation as well, with their removal as gases.

It will probably be advisable to circulate the water used as a diluent during operation and so save acetylene dissolved therein upon condensation of the water, since the solubility of acetylene in water is appreciable. Besides that, there will probably be by-products of value contained in the water that would be worth extraction.

Complete data on the composition of the non-acetylene reaction products is not yet available. CO is present at a fairly constant percentage approximately 15.

Herewith is given a table of illustrative gas analysis where constituents are reported in volume percent. Alkylenes are hydrocarbons of the ethylene series, exclusive of ethylene, which is separately reported.

| Test | $C_2H_2$ | $C_2H_4$ | CO | $H_2$ | Assumed | | alkylenes |
|---|---|---|---|---|---|---|---|
| | | | | | $N_2$ | $CH_4$ | |
| Test 114. $CO_2$ 3.38 $O_2$ .29 | 15.50 | .65 | 15.60 | 48.50 | 10.00 | 6.08 | 0.00 |
| Test 115. 2.26 .31 | 17.12 | 0.00 | 14.05 | 48.40 | 10.00 | 6.83 | 1.03 |
| Test 126. 3.61 .31 | 13.30 | 2.40 | 14.02 | 47.80 | 10.00 | 7.39 | 1.14 |

Test 126 was examined for allylene or methyl acetylene $CH_3.C:CH$ and showed 2.20% by volume.

It may be seen from these gas analyses that it is not necessary to the success of the process that the diluent which in these cases was steam, be totally inert and unreactive with the oil vapor or its intermediately formed products in the treating tube. Here there was a very appreciable formation of carbon monoxide which did not prevent the formation of acetylene or other of the constituents listed.

The operation of the apparatus shown in Fig. 2 is similar in general principle to that shown in Fig. 1. The vaporization of the oil takes place in the tube 43 by means of steam furnished from the header 44. The cracking tube 21 is governed as to its length and temperature by the same considerations given for the tube of Fig. 1. The contact mass (carborundum, quartz, sillimanite or equivalent) may, however, be of a grain size much less than ¼ the inside diameter of the tube. The treated gases pass into the tubes of the condenser and boiler 26, meeting first a steam zone and assisting the heater 53 in the generation of steam. They then pass down into the water zone where they are quickly cooled by the stream of water entering from the pipe 35.

Here, water condenses and the fixed gases then pass into the lower header 28 and find an exit through the pipe 38, while the condensed water is also recovered at 29 and may be returned to the system. The operation of the superheater and auxiliary cooler will be self-evident.

The condenser and boiler 26 is therefore also a heat interchanger serving to recover the heat content of the steam and other gases issuing from the cracking tube 21 in admixture. Said heat is thus entering the water coming from the pipe 35, which surrounds the tubes 27 of the condenser 26. The furnace 53 serves the purpose of supplying any deficiency of heat required for the evaporation of the required steam of the process. The superheater 42 furnishes any additional heat required to insure the total evaporation of the oil in the pipe 43. The auxiliary cooler 31 reduces the temperature of the incoming water in the pipe 29 sufficiently to render the condenser 26 operative.

An apparatus has been invented for this reaction therefore, in which there is marked conservation of heat, fuel, water and raw materials. Heat is recovered by the condensation of the steam, the water is likewise so recovered and the gas stripped in the stripping plant is stored in the gas holder until it is passed back to the furnace about the cracking tube, and there used as fuel.

The gases which may be dissolved in water recovered from the pipe 29 can be saved by the return of this water to the steam generator.

Inasmuch as my process is capable of wide variation as to raw materials, temperatures, diluting agents and other details, it is deemed best to devote the following paragraphs to their discussion.

I have found that I can make acetylene from the following raw materials, by the general process described in the foregoing matter:
1. Paraffins.
    *a.* Pure methane.
    *b.* Pure ethane.
    *c.* Casing-head gas vapor.
    *d.* Natural gas consisting of 85% $CH_4$ and 15% higher hydrocarbons.
    *e.* Gas oil containing from 30% to 35% naphthenes, 10–12% aromatics, remainder paraffines.
    *f.* Crude petroleum, kerosene, gasoline or any other liquid fraction.
    *g.* Natural gas carburetted with casing-head gasoline or any other fraction of crude petroleum.
2. Olefines.
    *a.* Ethylene
    *b.* Higher olefines.
3. Naphthenes
    *a.* Those in gas oil.
4. Aromatic hydrocarbons
    *a.* Benzol
    *b.* Toluol While it has been found that acetylene can be formed from methane, according to my process, it should be stated that yields are low in comparison to those obtained from ethane or higher members. I therefore prefer, in using natural gas as raw material, to use gas as high in higher members of the paraffin and olefine series as possible.

It is my opinion and that of others, that with the foregoing data, any chemist or chemical engineer skilled in cracking problems, will be able to so modify my general process as to be able to utilize any raw material in the list given, or to use mercury vapor or other diluents in place of steam or to operate with pure reduced pressure, as I have done with satisfactory results. I prefer to use steam, however, because of easy adaptability, cheapness, and lack of hazard.

Likewise, chemical engineering skill can devise means for operating the converse of my process, that is, to move the contact mass while the gas to be acted upon is held stationary. Such a process would comprise merely heating the contact mass to the proper reaction temperature, then dropping it through a gas holder containing a mixture with steam or mercury vapor of the gas to be acted upon. The contact mass would then be re-elevated to the top of the gas holder, reheated and again dropped in a stream until the gas had reached a satisfactory content of acetylene.

My process yields, besides acetylene, other gases and oils in admixture with it. The reaction product is a mixture of gases carrying yellowish or yellowish-gray fog particles, which are tars and oils in suspension. These may be, and are preferably separated from the gas before any other treatment, except cooling, is given it. Any ordinary form of gas filter or scrubber or the Cottrell precipitator may be used for this purpose. Oil or kerosene may be used for scrubbing. Some of the oils which have been collected in course of my experiments were much lighter in body than those which were the initial materials. Even where gas is used as the starting material in place of oil, light oils are obtained. Any or all of said oils and hydrocarbon condensates may be collected and added to the original raw material for another heat treatment to form acetylene. Scrubbing with acetone, or other well known means of separating acetylene, may be used to recover this main product.

The residual gas is a fuel gas of high calorific value, as may be seen from gas analyses reported herein. In the preferred form of my process, I burn this stripped gas under the cracking tube, thus making the process very economical of oil or other hydrocarbon used as raw material in forming acetylene.

By such procedure, I make the process economically feasible for almost any industrial locality, since the raw material may be oil, which can be shipped anywhere. The oil will act both as the raw material for the acetylene itself and will be also the source of gas for heating the treating tube, and for generating steam or vaporizing any other diluent of the process.

Throughout these experiments it has been repeatedly demonstrated that the mixture being treated must be held at high temperature only a very short length of time (2/1000 second to 5 seconds) and then cooled as quickly as possible. Otherwise, decomposition or polymerization of the acetylene, or both, will occur. Curve 11 shows this loss very plainly.

I claim as my invention:

1. The process of making acetylene and other products which comprises rapidly passing at least one non-aceytlene hydrocarbon in vapor form at a pressure between and including 2 mm. of mercury and atmospheric pressure over refractory material heated to a temperature of at least 1700° F. so that the vapors are heated for a period of between and including 2/1000 second and three seconds, then cooling the reaction products to a temperature at which acetylene is stable, and separating the acetylene from the other products.

2. A process according to claim 1, in which the refractory material is carborundum grain.

3. A process according to claim 1, in which the non-acetylene hydrocarbon vapors are natural gas.

4. A process according to claim 1, in which the non-acetylene hydrocarbon vapors are those produced by gasifying petroleum fractions.

5. A process according to claim 1, in which the non-acetylene hydrocarbon vapors are those produced by carburetting natural gas with gasified petroleum fractions.

6. The process of making acetylene and other products which comprises passing at least one non-acetylene hydrocarbon in vapor form at a pressure between and including 2 mm. of mercury and atmospheric pressure over a refractory contact material heated to a temperature of at least 1700° F. so that the period of contact with the refractory material is approximately $\frac{1}{10}$ second, then cooling the reaction products as quickly as possible to a temperature at which acetylene is stable, and separating the acetylene from the other products.

7. A process according to claim 6, in which the non-acetylene hydrocarbon vapors are natural gas.

8. A process according to claim 6, in which the non-acetylene hydrocarbon vapors are those produced by gasifying petroleum fractions.

9. A process according to claim 6, in which the non-acetylene hydrocarbon vapors are those produced by carburetting natural gas with gasified petroleum fractions.

10. A process according to claim 6, in which the refractory contact material is carborundum grain.

11. A process of producing a mixture of gases containing at least 2% of acetylene, which comprises: passing a gaseous mixture containing substantial amounts of hydrocarbon other than acetylene and heavier than methane, said gaseous mixture being at a pressure between and including 2 mm. of mercury and atmospheric pressure, through a tube containing refractory material heated to a temperature of at least 1700° F. so that the period of contact of said gaseous mixture with said refractory material is not in excess of three seconds, and rapidly cooling the heated mixture to a temperature at which acetylene is stable.

12. A process of producing a mixture of gases containing at least 2% of acetylene, which comprises: passing a gaseous mixture containing substantial amounts of hydrocarbon other than acetylene and heavier than methane and liquid at atmospheric temperatures and pressures, said gaseous mixture being at a pressure between and including 2 mm. of mercury and atmospheric pressure, through a tube containing refractory material heated to a temperature of at least 1700° F. so that the period of contact of said gaseous mixture with said refractory material is not in excess of three seconds, and rapidly cooling the heated mixture to a temperature at which acetylene is stable.

In testimony whereof, I have hereunto set my hand at Los Angeles, California, this 22nd day of May, 1928.

ROBERT G. WULFF.